United States Patent

Kukino et al.

Patent Number: 5,882,777
Date of Patent: *Mar. 16, 1999

[54] SUPER HARD COMPOSITE MATERIAL FOR TOOLS

[75] Inventors: Satoru Kukino; Mitsuhiro Goto; Tetsuo Nakai; Makoto Setoyama; Takashi Yoshioka, all of Hyogo, Japan

[73] Assignee: Sumitomo Electric Industries, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 509,744

[22] Filed: Aug. 1, 1995

[30] Foreign Application Priority Data

Aug. 1, 1994 [JP] Japan .................................. 6-199101

[51] Int. Cl.$^6$ .................................................. C23C 14/06
[52] U.S. Cl. .............................. 428/216; 51/293; 51/295; 51/307; 51/309; 75/238; 407/119; 428/469; 428/698; 428/699; 428/704
[58] Field of Search .................................. 428/698, 704, 428/216, 469, 699; 51/293, 295, 307, 309; 407/119; 75/238

[56] References Cited

U.S. PATENT DOCUMENTS

| | | | |
|---|---|---|---|
| 4,343,651 | 8/1982 | Yazu et al. | 75/238 |
| 4,554,201 | 11/1985 | Andreev et al. | 428/699 |
| 4,643,951 | 2/1987 | Keem et al. | 428/698 |
| 4,714,660 | 12/1987 | Gates, Jr. | 428/698 |
| 4,753,854 | 6/1988 | Gavrilov et al. | 428/698 |
| 4,776,863 | 10/1988 | VandenBerg et al. | 51/295 |
| 4,835,062 | 5/1989 | Holleck | 428/469 |
| 4,895,770 | 1/1990 | Schintlmeister et al. | 428/698 |
| 4,911,756 | 3/1990 | Nakai et al. | 75/238 |
| 4,984,940 | 1/1991 | Bryant et al. | 407/119 |
| 5,071,693 | 12/1991 | Sue et al. | 428/698 |
| 5,092,920 | 3/1992 | Nakai et al. | 75/238 |
| 5,139,537 | 8/1992 | Julien | 51/293 |
| 5,271,749 | 12/1993 | Rav et al. | 51/293 |
| 5,326,380 | 7/1994 | Yao et al. | 51/293 |
| 5,503,912 | 4/1996 | Setoyama et al. | 428/216 |

Primary Examiner—A. A. Turner
Attorney, Agent, or Firm—Foley & Lardner

[57] ABSTRACT

Super hard composite material for tools, comprising a substrate of CBN sintered body containing more than 20% by volume of cubic boron nitride (CBN), improved in strength of base material, wear-resistance, hardness at high temperatures and acid-resistance usable in cutting work of steels which are difficult to be machined. The substrate (2) has a laminated film (1) consisting of super thin films (a) and (b) each deposited alternatively on the substrate (2), the super thin film (a) being made of nitride and/or carbide of at least one element selected from a group comprising IVa group elements, Va group elements, VIa group elements, Al and B and possessing a crystal structure of cubic system and metallic bond property, the super thin film (b) being made of at least one compound possessing a crystal structure other than cubic system and covalent bond property under equilibrium condition at ambient temperature and pressure, each unit layer of the super thin films (a) and (b) having a thickness of 0.2 nm to 20 nm, and the laminated film (1) on the whole possessing a crystal structure of cubic system.

19 Claims, 3 Drawing Sheets

COMPOSITION atm% (EXCEPT N)

SUPER HARD COMPOSITE MATERIAL FOR TOOLS

BACKGROUND OF THE INVENTION

1. Field of the Invention

The present invention relates to improvement in material for tools, made of sintered body (CBN sintered body, hereinafter) consisting mainly of cubic boron nitride (CBN), and in particular to a super hard composite material improved in wear-resistance.

2. Description of the Related Arts

Cubic boron nitride (CBN) is the hardest material next to diamond and is used in cutting tools. CBN sintered body is produced by sintering crystalline particles of CBN with binder (sintering aid). The CBN sintered bodies can be classified mainly into following three types:

(1) CBN sintered body containing 20 to 70% by volume of CBN crystalline particles, binder being carbide, nitride or carbonitride of Ti (i. e. Japanese patent publication-A-53-77811).

(2) CBN sintered body containing more than 80% by volume of CBN crystalline particles, binder being Al and Co metals (i. e. Japanese patent publication-B-52-43846).

(3) CBN sintered body containing more than 95% by volume of CBN crystalline particles, binder being $M_3B_2N_4$ in which M is alkali earth metal (i. e Japanese patent publication-A-59-57967).

CBN sintered body possesses very high hardness and thermal conductivity (or improved strength at high temperatures) and is used in cutting tools for a variety of steels. For example, the type (1) of CBN sintered body possesses Vickers hardness of 2,800 to 3,700 and shows improved wear-resistance and hence is used in cutting of hardened steels. CBN sintered body of the type (2) possesses Vickers hardness of 3,500 to 4,300 and shows improved resistances to wear and chipping and hence is used in cutting of high-hard cast iron or the like. CBN sintered body of the type (3) possesses Vickers hardness of 4,000 to 4,800 and high thermal conductivity and hence is used in bonding tools or the like.

These CBN sintered bodies, however, have demerits of cleavage and low resistance to acids, so that wear is inevitable in tools made of CBN sintered body alone due to insufficient resistance to wear when cutting work is effected on such materials that are difficult to be cut such as steel for transmission.

It is proposed to coating a surface of the CBN sintered body with a variety of wear-resisting layers so as to improve the resistance to wear of CBN (i. e. Japanese patent publication-A-59-134603, A-61-183187, A-1-96083, and A-1-96084). However, the hardness of known wear-resisting layers are lower than that of CBN sintered body and hence wear is investable.

It is also proposed to coating a surface of cemented carbide tool with TiN, (TiAl)N, TiCN, $Al_2O_3$ or the like. In this tool, however, the base of cemented carbide deforms plastically at high cutting temperature, resulting in that the wear-resisting layer peels off or destroyed.

An object of the present invention is to provide a super hard composite material for tools, improved in strength of base material and in wear-resistance and possessing improved hardness and resistance to oxidation at high temperatures, which can be used in cutting work of hardened steels, high-grade high-hard cast iron or the like.

SUMMARY OF THE INVENTION

The present invention provides a super hard composite material for tools, comprising a substrate of CBN sintered body containing more than 20% by volume of cubic boron nitride (CBN), characterized in that the substrate has a laminated film having a laminated structure of super thin films each deposited alternatively on at least a portion of the substrate where cutting participate, each unit layer of the super thin films having a thickness of 0.2 μm to 20 μm.

The "laminated film" consists of super thin films of following compounds (a) and (b) deposited alternatively on the substrate and possessing, on the whole, a crystal structure of cubic system:

(a) nitride or carbonitride of at least one element selected from a group comprising IVb group elements, Vb group elements, IVb group elements, Al and B and possessing a crystal structure of cubic system and metallic bond property (metallic compound, hereinafter), and (b) at least one compound possessing a crystal structure other than cubic system and covalent bond property (covalent compound, hereinafter), under equilibrium condition at ambient temperature and pressure.

BRIEF DESCRIPTION OF THE DRAWING

FIG. 1 illustrates a cross sectional view of a super hard composite material for tools, comprising a laminated film (1) consisting of unit super thin films (a) and (b) deposited alternatively on a substrate (2). An intermediate layer (3) and a surface layer (4) can be formed optionally. The super thin film (a) or (b) is emphasized in FIG. 1 but its actual thickness is 0.2 to 20 nm which is about 1/100 of thickness of the intermediate layer (3) which is 0.05 to 5 μm thick and thickness of the surface layer (4) which is 0.1 to 5 μm thick.

Figure 1:
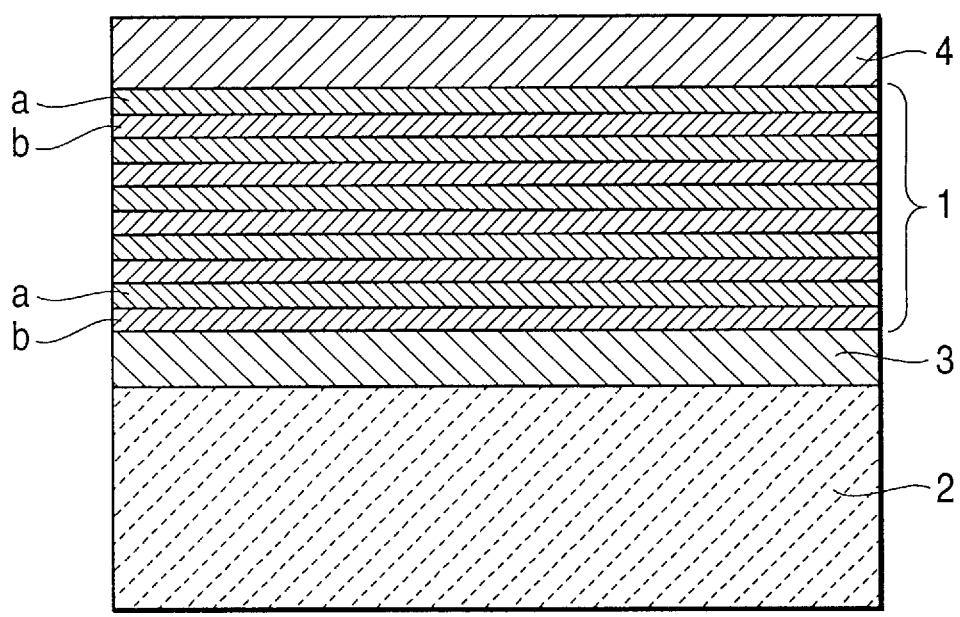
FIG. 1 is an illustrative cross sectional view of a super hard composite material according to the present invention.

A "lamination cycle" or lamination pitch is a repeating unit of the super thin films (a) and (b) and is a sum λ of their thickness [λ=(a)+(b)].

In the laminated film (1) consisting of super thin films (a) and (b) according to the present invention, a crystal structure of a thin film of at least one covalent compound is converted mainly to a crystal structure having metallic bond property, so that the laminated film (1) possesses, on the whole, a single crystal structure of cubic system The laminated film (1) consisting of super thin films (a) and (b) can have a structure ("composition modulated layer" hereinafter) in which two compounds or more than two compounds totally or partly change their compositions in a continuous manner without forming interfaces and which contains partially a covalent compound of cubic system The laminated film (1) can have a structure in which clear interfaces and the composition modulated layer having no clear interfaces are combined.

According to one aspect of the present invention, the laminated film (1) consisting of super thin films (a) and (b)

can have a composition modulated layer in which composition change gradually and continuously is interposed between adjacent unit super thin films (a) and (b). A merit of the laminated film (1) having composition modulated layers is that the laminated film (1) can be produced in wider ranges of manufacturing conditions.

Lamination or stratification can be done by combining a metallic compound and a covalent compound. The compounds can consist of different elements, or can contain common element(s) or can consist of same elements but have different ratio of elements. For example, in a case of a combination of Ti and Al, metallic compound is obtained at Ti-rich ratio while covalent compound is obtained at Al-rich ration. The same result is obtained when Al is replaced by B. When there are a plurality of super thin film (a) and/or (b), each film (a) or (b) can be made of identical compound for all layers or different compounds for each layer.

The covalent compound (b) can be compounds containing at least one of Al and B, and is preferably aluminium nitride (AlN).

The nitride or carbonitride compound (a) having metallic bond property can be nitride, carbide, composite nitride, composite carbide or composite carbonitride containing at least one element selected from a group comprising Ti, Zr, Cr, V, Hf, Al and B.

The laminated film (1) consisting of super thin films can be prepared by physical vapor deposition (PVD) technique such as sputtering and ion-plating which permits to perform surface-treatment of substrate or tool without deteriorating its inherent high-resistance to wear and breakage.

Lamination or stratification of super thin films according to the present invention requires such a process that can form a film of covalent compound which contains less amorphous portion but is crystalline. In practice, "arc-ion plating" which can highly ionize material elements is preferably used. Other techniques such as reactive ion plating and sputtering including magnetron sputtering can be used but the resulting films produced by these techniques show relatively lower properties because of coexistence of amorphous components which is inevitable.

In particular, reactive PVD technique is preferable used. In fact, higher ionization rates can be obtain by the reactive PVD technique in which a target or plural targets of metal or alloy containing at least one elements selected from IVb, Vb, IVb elements, B and Al and a gas containing at least one of C and N than by simple PVD in which a target made of nitride and/or carbide is used. The arc-ion plating assuring high ionization rate and which can produce crystalline covalent compounds is advantageously used to realize the highly crystalline cubic covalent compound according to the present invention. Other gas than material gas, such as inert gas of Ar and He and etchant gas of $H_2$ can be introduced into a film-forming chamber.

When the laminated film consisting of super thin films according to the present invention is applied to cutting tools, in particular to cutting tips, it is preferable to coat face and flank of the lip with different laminated films possessing different lamination cycles which depend to properties required in face and flank respectively.

Figure 2A:
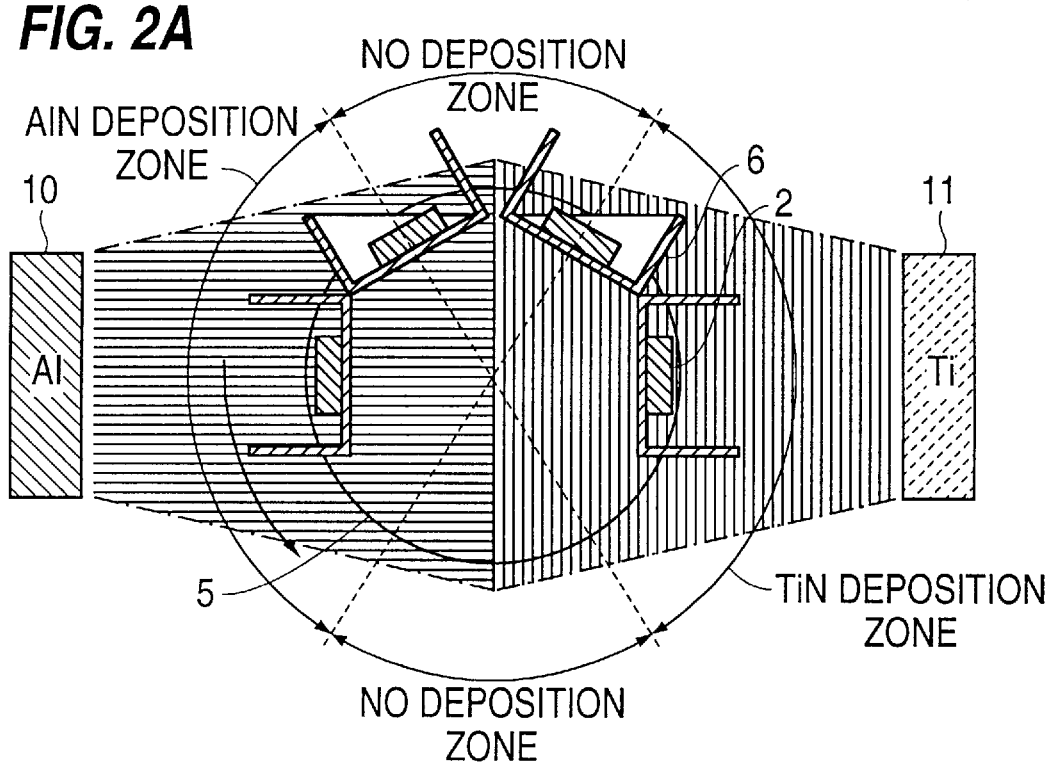
FIG. 2A illustrates first embodiment of an apparatus for preparing a laminated film according to the present invention.

FIG. 2A is an illustrative view of first embodiment of an apparatus for producing the laminated film consisting of super thin films according to the present invention.

Each substrate (2) such as tool or tip is held on a rotary holder (5). While the rotary holder (5) is rotated, vapor of Al and Ti are created from two vapor sources (10, 11) by creating an arc discharge between the vapor sources (10, 11) and respective arc electrode (20) in nitrogen gas atmosphere, so that super thin films of AlN and TiN are deposited alternately on a surface of the substrate (2).

Figure 2B:
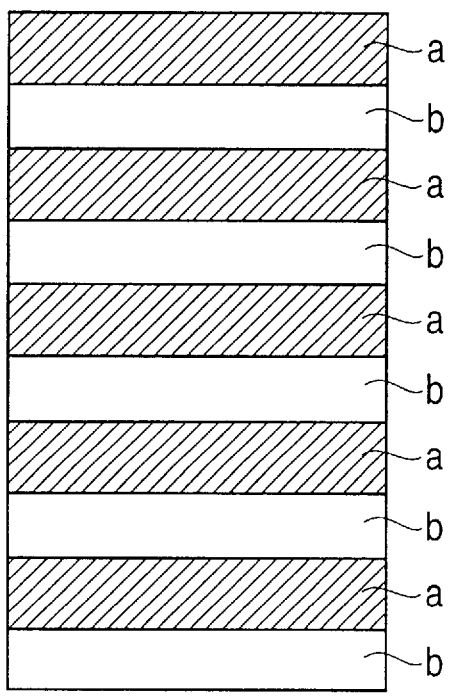
FIG. 2B is an illustrative view of the laminated film obtained by the apparatus of FIG. 2A.
Figure 2C:
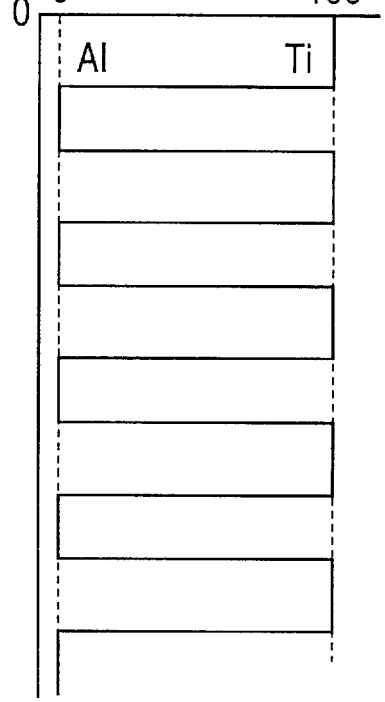
FIG. 2C is an illustrative view of composition distribution of the laminated film obtained by the apparatus of FIG. 2A.

In this embodiment, a shade or mask (6) is used so as to produce a laminated film having substantially no composition modulated layer (a/b/a - - - ) as is shown in FIG. 2B. FIG. 2C shows a distribution in components of the resulting laminated film consisting of super thin films.

Figure 3A:
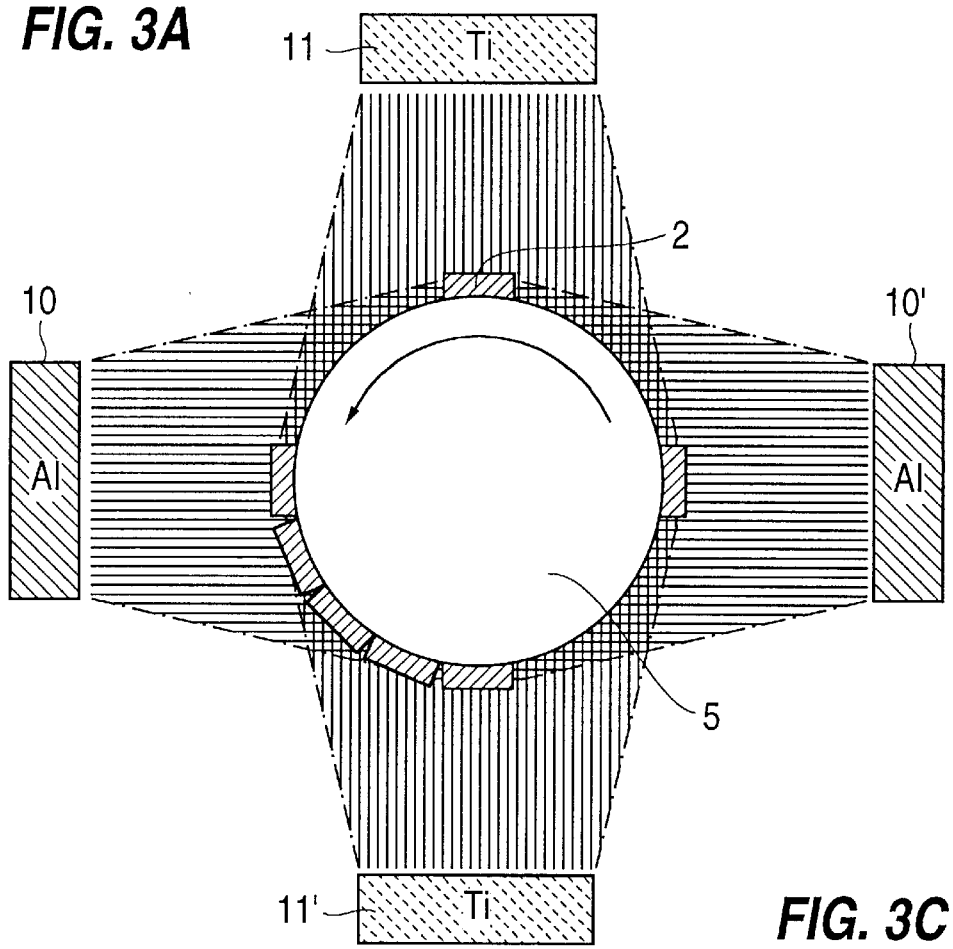
FIG. 3A illustrates second embodiment of the apparatus for preparing the laminated film according to the present invention.
Figure 3B:
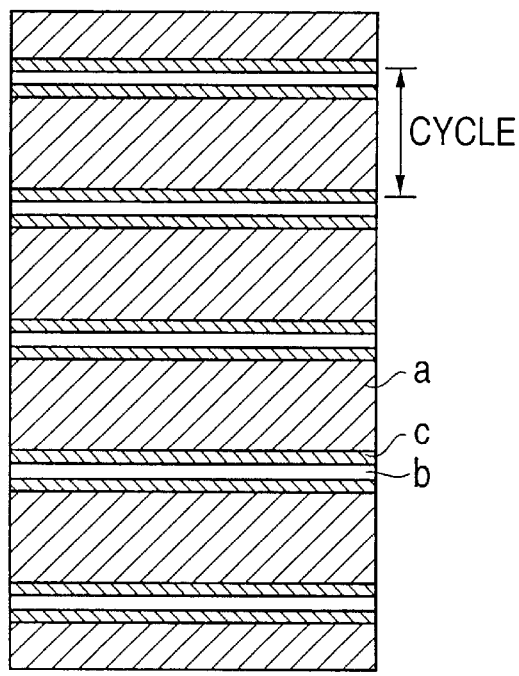
FIG. 3B is an illustrative view of the laminated film obtained by the apparatus of FIG. 3A.
Figure 3C:
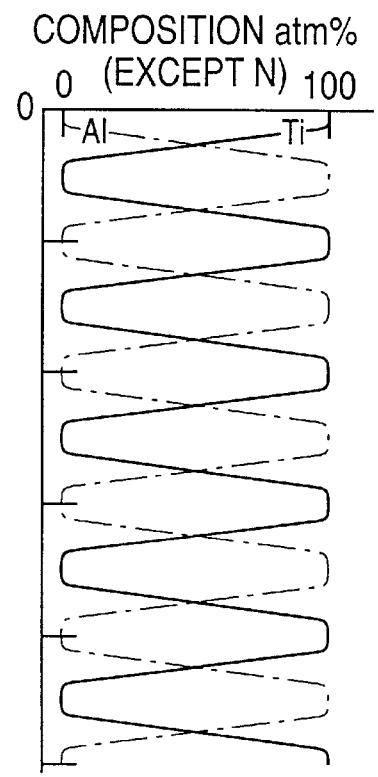
FIG. 3C is an illustrative view of composition distribution of the laminated film obtained by the apparatus of FIG. 3A.

FIG. 3A is an illustrative view of second embodiment of the apparatus for producing the laminated film consisting of super thin films according to the present invention. This second embodiment differs from the first embodiment in that composition modulated layers can be formed in this case. In fact, four vapor sources (10, 10', 11, 11') of Al and Ti surround the rotary holder (5) so that the composition modulated layers (c) are formed at zones where both vapor of Ti and Al arrive to produce a nitride of Ti and Al. FIG. 3B illustrates a laminated film obtained by this Example and FIG. 3C shows a distribution in components of the resulting laminated film.

At least one intermediate layer (3) having a thickness of 0.05 to 5 μm is preferably interposed between the substrate (2) and the laminated film (1). This intermediate layer (3) is preferably made of a material selected from a group comprising boride, nitride, carbide and oxide of IVa, Va and VIa elements and their solid solutions. The intermediate layer (3) functions to increase adhesion between the laminated film (1) and the substrate (2). Such intermediate layer is expected to reduce residual stress in the film deposited on a substrate which differs from the film in its property by assuring gradual control of its properties.

It is also preferable to deposit a surface layer (4) having a thickness of 0.1 to 5 μm on an outer surface of the laminated film (1). The surface layer (4) is preferably made of a material selected from a group comprising boride, nitride, carbide and oxide of IVa, Va and VIa elements.

In general, covalent compounds possess crystal structures other than cubic system and show high hardness and high resistance to heat. For example, aluminium nitride (AlN) used in a form of sintered articles possess the wurtzite structure of equilibrium phase at ambient temperature and pressure and show excellent property in hardness and heat-resistance. Diamond and cubic boron nitride (CBN) which are covalent compounds having a crystal structure of cubic system which is non-equilibrium phase at ambient temperature and pressure show excellent property in hardness and heat-resistance.

From these facts, it is expected that there are substances that show excellent property in hardness and heat-resistance in non-equilibrium phase of cubic system in other covalent compounds. However, a thin film of cubic system which is non-equilibrium phase of covalent compound is very difficult to be synthesized, and even if synthesized, such film can not be used as a wear-resisting film or a protective film, because the film shows very poor adhesion to a substrate or an intermediate layer which is usually a hard thin film having metallic bond property possessing a crystal structure of NaCl type cubic system such as TiN and TiCN.

In order to compromise properties of covalent compound and metallic compound one may think of their laminated structure. Simple lamination, however, result in a poor film in which two layers of the compounds are connected by weak bond at interface and hence separate easily, so that such conventional film can not be used as a protective film or wear-resisting film. In fact, in the conventional lamination film, satisfactory bonding is not realized among atoms at interfaces between substrate and intermediate layer and between adjacent layers of the compounds because two layers of the compounds have such different bonding properties as covalent bond and metallic bond property in addition to a difference in their crystal structures.

Japanese patent laid-open No. 5-80547 discloses a multi-layered film consisting of thin films of 0.5 to 40 nm as a protective film for metal surfaces. In this patent document, the multi-layered film must have an interface which is coherent to lattices of crystals. In fact, desired epitaxial growth of thin films in this multi-layered film is assured only in such a case that thin films are made of metallic compounds and adjacent two thin films have substantially identical properties including lattice constants (such as distances between planes).

The laminated film (1) adopted in the present invention is obtained by depositing alternatively a super thin film (a) having a crystal structure of cubic system and consisting mainly of a metallic compound and a super thin film (b) having a crystal structure other than cubic system under equilibrium condition at ambient temperature and pressure and consisting mainly of a covalent compound, each unit layer of the super thin films (a) and (b) having a thickness of 0.2 μm to 20 μm, the laminated film, on the whole, possessing a crystal structure of cubic system.

In fact, according to the present invention, a compound consisting mainly of covalent compound which has not a crystal structure of cubic system under equilibrium condition at ambient temperature and pressure and has a form of such an extremely thin film as less than 20 nm and is sandwiched by adjacent two thin films made mainly of metallic compound, each having a crystal structure of cubic system and having such an extremely thin film as less than 20 nm, and the resulting laminated film possesses, on the whole, a crystal structure of cubic system. In other words, the two different thin films (a) and (b) are sandwiched alternatively in the laminated film (1) according to the present invention, resulting in changes in crystal structure between adjacent thin films to produce a crystal structure of cubic system. This fact is confirmed by analysis of X-ray diffraction chart.

In the laminated film (1) according to the present invention, the crystal structure of covalent compound changes to cubic system. It is thought that hardness of the laminated film (1) according to the present invention is attributed to accumulation of strain energy caused by the changes in crystal structure in the compound and accumulation of strain energy caused by bonding of atoms in each layer of both compounds at their interfaces and in the composition modulation layer In the laminated film (1) according to the present invention, inherent excellent property of the covalent compound is exhibited and also satisfactory atomic bond is created between thin films in the laminated film because the crystal structures are changed to an identical structure, and the laminated film (1) possesses satisfactory adhesion to the intermediate layer and the substrate. The laminated film (1) according to the present invention is improved in hardness, acid-resistance and wear-resistance comparing to the conventional protective film or coated layer. Therefore, tools possessing the laminated film (1) according to the present invention exhibit excellent wear-resistance and heat-resistance.

Thickness of thin film of the metallic compound is not limited specially but is preferably less than 20 nm because advantages obtained by the covalent compound such as high hardness and high acid-resistance are not realized if the thickness of metallic compound layer increase comparing to that of the covalent compound layer.

If the thickness of thin films (a) and (b) are not higher than 0.2 nm, the laminated film (1) according to the present invention as a whole becomes a mixed layer of thin films (a) and (b) due to mutual diffusion or other influences, so that advantages of the present invention can not be expected.

If the thickness of the laminated film (1) according to the present invention is not higher than 0.5 μm, no improvement in wear-resistance is observed. On the contrary, if the thickness of the laminated film (1) is exceeds 10 μm, adhesion to the substrate become lower because of influence of residual stress in the laminated film (1). Therefore, the thickness of the laminated film (1) is preferably selected in a range of 0.5 to 10 μm.

It should be noted that advantages of the laminated film (1) according to the present invention are not resulted from an interface between compounds layered or laminated and hence there is no necessity of existence of interface between compounds, regardless of clear or unclear interface. In fact, the advantages of the present invention can be realized even in such a structure or composition modulation layer that all or part of elements in adjacent two compounds change continuously at an interface and a covalent compound of cubic system is realized in certain composition range. In this case, the crystal structure of the covalent compound is stabilized by the cubic system, so that hardness and acid-resistance are improved, excellent cutting performance improved in wear-resistance and heat-resistance is realized and it can avoid peeling off caused by defects or sharp change in stress in a film.

The laminated film (1) according to the present invention shows such very high hardness as Vickers hardness of higher than 4,000 kgf/mm$^2$ under a load of 1 gf.

Improvement in adhesion of the intermediate layer (3) is not observed even if the thickness thereof is not higher than 0.05 μm and exceeds 5 μm. Therefore, the thickness of the intermediate layer (2) is preferably selected in a range between 0.05 and 5 μm from the view point of productivity.

The thickness of the surface layer (4) formed on the laminated film (1) according to the present invention is preferably in a range between 0.01 and 5 μm. Improvement in wear-resistance is not observed in a thickness of less than 0.1 μm. Thickness of more than 5 μm also show no improvement in wear-resistance due to peel-off or other reasons.

The super hard composite material according to the present invention is shaped or machined into and advantageously used as cutting tools such as tip, drills and end mills. It is confirmed that tools prepared from the super hard composite material according to the present invention show surprisingly superior cutting performance and long lives.

In a cutting tip, it is confirmed that the cutting performance and life of the cutting tip increase remarkably when the lamination cycle of the laminated film (1) at the face is bigger than the lamination cycle at the flank. In a different tip having a different shape and application, the cutting performance and life of the cutting tip increase remarkably when the lamination cycle at the flank is bigger than the lamination cycle at the face. This means that required properties such as wear-resistance and acid-resistance for the face and flank are depend to applications and optimum lamination cycle may be differenciated from each other.

The substrate (2) can be selected from following preferable three CBN sintered bodies (1) to (3):

(1) CBN sintered article containing 30 to 90% by volume of cubic boron nitride (CBN), reminding parts being a binder consisting of at least one member selected from a group comprising nitride, carbide, boride and oxide of IVb, Vb and IVb elements and their solid solutions and aluminium compound, and inevitable impurities.

The binder consist preferably of 50 to 98% by weight of at least one member selected from a group comprising TiC, TiN, TiCN, (TiM)C, (TiM)N and (TiM)CN in which M is a transition metal selected from IVa, Va and VIa elements except Ti and 2 to 50% by weight of aluminium compound.

(2) CBN sintered body containing 40 to 95% by volume of cubic boron nitride (CBN), reminding parts being at least one binder selected from a group comprising TiN, boride and carbide of Co or W, aluminum nitride, aluminum boride and their solid solutions and inevitable impurities. The binder contains preferably 1 to 50% by weight of TiN.

(3) CBN sintered body containing more than 90% by volume of CBN crystalline particles, reminding parts being a binder consisting of boronitride of Ia or IIa elements and TiN and inevitable impurities.

The binder contains preferably 1 to 50% by weight of TiN.

CBN sintered body of the type (1) itself is known and its properties and its production method are described in details in the Japanese patent publication-A-53-77811.

CBN sintered body of the type (2) can be prepared by adding TiN to a binder disclosed in the Japanese patent patent publication-B-52-43846 Addition of TiN increase adhesion to the laminated film (1) of the present invention.

CBN sintered body of the type (3) can be prepared by adding TiN to a binder disclosed in the Japanese patent publication-A-59-57967. Addition of TiN increase adhesion to the laminated film (1) in this type CBN sintered body also.

In the type (1), CBN powder, binder powder of TiN, TiC and their solid solution and aluminum and or aluminum compound, and inevitable impurities are sintered at high-temperature and high pressure so that such compounds as titanium boride ($TiB_2$), aluminium boride ($AlB_2$) and aluminum nitride (AlN) are produced at an interface between CBN particle and binder, resulting in increase bonding force between particles and improvement in toughness and strength of the resulting sintered article.

In particular, when TiN or TiC is used in the binder, it is advantageous to use excess amount of free titanium in such a manner that in the value of "z" of TiCz and TiNz is shifted to such out of the stoichiometric value as in a range of $0.5 \leq z \leq 0.85$ for TiNz and in a range of $0.65 \leq z \leq 0.85$ for for TiCz respectively, so that promote reaction between CBN and the binder to produce reaction products such as $AlB_2$, AlN and $TiB_2$ which contribute improvement in wear-resistance and strength. If the value of "z" is lower than 0.5 and 0.65, powder charging become difficult due to beat generated by oxidation reaction. On the contrary, if the "z" value exceeds 0.85, no advantage is obtained in reactivity with CBN comparing to a case where TiC and TiN are used in stoichiometric values.

When powders of TiCz ($0.5 \leq z \leq 0.85$) and TiNz ($0.65 \leq z \leq 0.85$) are used as a starting material for CBN sintered body, the content of aluminum and/or aluminum compound in CBN sintered body should be higher than 2% by weight, otherwise satisfactory reaction between CBN and aluminum and/or aluminum compound is not effected resulting in CBN is not held satisfactorily by binder. On the contrary, if the contents exceeds over 40% by weight, a proportion of CBN which has higher hardness and mechanical strength than $AlB_2$ and AlN decrease, resulting in that wear-resistance drop sharply. From this reason, in the prior arts, When powders of TiCz ($0.5 \leq z \leq 0.85$) and TiNz ($0.65 \leq z \leq 0.85$) are used as a starting material for CBN sintered body for producing tools, it was indispensable to respect such ratio as 60 to 80% by weight of TiN or TiC and 20 to 40% by weight of aluminium compound, $TiB_2$ and inevitable impurities.

However, in a super hard composite material for tools according to the present invention, relatively low wear-resistance which is a weak point of CBN sintered body can be covered by the laminated film consisting of super thin films which possessing improved wear-resistance. Therefore, in the CBN sintered body used in the present invention for producing the super hard composite material for tools, toughness and strength are much required than wear-resistance. In other words, it means that such a material that could not be used as a base for cutting tools to be used in cutting operation of hard difficult materials because of poor wear-resistance although it possesses enough toughness can be used in the present invention. For example, a CBN sintered body containing excess amount of aluminum compound, $TiB_2$ and inevitable impurities in the binder will be an ideal base material for a super hard composite material for tools possessing resistance to wear and damage after the the laminated film consisting of super thin films according to the present invention is deposited.

In particular, when powders of TiCz ($0.5 \leq z \leq 0.85$) or TiNz ($0.65 \leq z \leq 0.85$) is used as a starting material for CBN sintered body, the above-mentioned advantage is remarkable when the binder in CBN sintered article consists of 50 to 80% by weight of TiN and 20 to 50% by weight of aluminium compound, $TiB_2$ and inevitable impurities and possesses the transverse rupture strength determined according to JIS of higher than 110 $kgf/mm^2$ and when the binder in CBN sintered body consists of 50 to 80% by weight of TiC and 20 to 50% by weight of aluminium compound, $TiB_2$ and inevitable impurities and possesses the transverse rupture strength determined according to JIS of higher than 105 $kgf/mm^2$. In these materials, satisfactory long tool lives which are acceptable in actual uses can be realized when they are used in difficult interrupting hard cutting operation of hardened steel having high hardness to which the conventional CBN sintered tools or known CBN tools coated with wear-resisting coating could not be used.

The contents of aluminium compound, $TiB_2$ and inevitable impurities in a CBN sintered body starting from TiCz ($0.5 \leq z \leq 0.85$) or TiNz ($0.65 \leq z \leq 0.85$) must be lower than 50% by weight. If the contents exceed 50% by weight, CBN sintered body possesses insufficient hardness and strength that can not be used as a substrate for composite material for tools.

In case of CBN sintered body of type (2), the CBN powder has preferably an average particle size of less than 3 μm so as to produce CBN sintered body having the transverse rupture strength determined according to JIS of higher than 105 $kgf/mm^2$. The CBN sintered body coated with the laminated film according to the present invention can be used in difficult interrupting hard cutting operation of hardened steel having high hardness to which the conventional CBN sintered tools or known CBN tools coated with wear-resisting coating could not be used and satisfactory long tool life which is acceptable in actual uses is obtained.

In conclusion, the present invention provides a super hard composite material has improved strength in base material, wear-resistance and hardness (acid-resistance) at high temperatures and hence can be used in cutting work of steels which are difficult to be machined.

The present invention will be described in more details with referring to Examples but the present invention is not limited to these Examples.

DESCRIPTION OF PREFERRED EMBODIMENTS

EXAMPLE 1

Powder of TiN and powder of AlN were mixed at a ratio of 80:20 by weight in a pot made of cemented carbide alloy containing balls of the same mater alto obtain a binder powder. Powder of CBN was mixed with the binder powder at a ratio of 70:30 by volume and the resulting powder mixture was sintered at 1,400° C. under a pressure of 48 kb for 20 minutes in a container of Mo.

The resulting sintered article was shaped into a tip for cutting tool and the laminated film consisting of super thin films was deposited on portions of the tip where cutting participate by ion-plating technique with vacuum arc-discharge. In operation, Ti target and Al target were set in a vacuum chamber as is shown in FIG. 2A, tips were held on a tip holder arranged at the center of the targets. After the vacuum chamber was evacuated to a pressure of $10^{-5}$ Torr, argon (Ar) gas was introduced to create a pressure of $10^{-2}$ Torr, the tips were heated to 500° C. and a voltage of –2,000 V was applied to the tips while the tip holder is rotated to cleaned surface of the tips. After then, argon gas is evacuated and nitrogen ($N_2$) gas was introduced at a rate of 300 cc/min. Ti and Al targets were vaporized and ionized in arc discharge so that super thin films of TiN and AlN were deposited alternatively in the tip. Lamination cycle and thickness of the super thin films of TiN and AlN were adjusted by changing a rotational speed of the tip holder and the degree of vacuum arc discharge. Total thickness of the laminated film was controlled by deposition time duration.

A variety of laminated film consisting of super thin films were deposited by replacing Ti target by other element of IVa to VIa groups such as Zr.

For comparison, the conventional coating films were deposited on the same tip (sample No. 1-28 to 1-30).

Results are summarized in Table 1 in which,

1) "cycle" is the lamination cycle,
2) "total" is a total thickness,
3) "crystal structure" is a crystal structure of a single film under equilibrium condition at ambient temperature and pressure, and
4) "X-ray pattern" is a X-ray pattern of the laminated film on the whole.

Wear-resistance of the resulting tips was determined by cutting test in which a round steel rod (SUJ2) having a hardness of HRC60 was cut along its periphery at a cutting speed of 120 mm/min, a depth of cut of 0.2 mm, a feed of 0.1 mm per revolution and for 20 minutes in a dry condition to measure a flank wear width (mm).

In the case of the conventional CBN tool having no laminated film, the flank wear width was 0.250 mm.

TABLE 1

| | | structure of coated hard layers ($\mu$m) | | | | | | | |
|---|---|---|---|---|---|---|---|---|---|
| | intermediate | laminated film (1) of super thin films (a)/(b) | | | | | | | |
| sample No | layer (3) ($\mu$m) | (a) (thicknees: nm) | (b) | cycle[1] (nm) | total[2] ($\mu$m) | crystal[3] structure | X-ray[4] pattern | surface layer (4) | flank wear (mm) | mark |
| 1–1 | none | TiN* (0.14) | AlN* (0.16) | 0.3* | 3.4 | different | cubic | none | 0.240 | bad |
| 1–2 | none | TiN (0.24) | AlN (0.26) | 0.5 | 3.5 | different | cubic | none | 0.139 | good |
| 1–3 | none | TiN (1.0) | AlN (1.0) | 2.0 | 3.8 | different | cubic | none | 0.145 | good |
| 1–4 | none | TiN (1.2) | AlN (1.3) | 2.5 | 3.5 | different | cubic | none | 0.122 | good |
| 1–5 | none | TiN (3.6) | AlN (2.4) | 6.0 | 3.6 | different | cubic | none | 0.119 | very good |
| 1–6 | none | TiN (5.9) | AlN (4.0) | 9.9 | 3.4 | different | cubic | none | 0.107 | very good |
| 1–7 | none | TiN (7.0) | AlN (12.0) | 19.0 | 3.5 | different | cubic | none | 0.124 | good |
| 1–8 | none | TiN (4.0) | AlN* (21.0) | 25.0 | 3.6 | different | cubic +* hexagonal | none | 0.196 | bad |
| 1–9 | none | TiN (1.3) | ALN (1.4) | 2.7 | 0.3* | different | cubic | none | 0.188 | bad |
| 1–10 | none | TiN (1.3) | AlN (1.4) | 2.7 | 0.5 | different | cubic | none | 0.142 | good |
| 1–11 | none | TIN (1.3) | AlN (1.4) | 2.7 | 2.0 | different | cubic | none | 0.130 | very good |
| 1–12 | none | TiN (1.3) | AlN (1.4) | 2.7 | 5.0 | different | cubic | none | 0.111 | very good |
| 1–13 | none | TiN (1.3) | AlN (1.4) | 2.7 | 10.0 | different | cubic | none | 0.128 | very good |
| 1–14 | none | TiN (1.3) | AlN (1.4) | 2.7 | 13.0* | different | cubic | none | 0.190 | bad |
| 1–15 | TiN (0.01)* | TiN (1.3) | AlN (1.4) | 2.7 | 3.6 | different | cubic | none | 0.185 | bad |
| 1–16 | TiN (0.05) | TiN (1.3) | AlN (1.4) | 2.7 | 3.7 | different | cubic + hexagonal | none | 0.134 | good |
| 1–17 | TiN (0.5) | TiN (1.3) | AlN (1.4) | 2.7 | 3.8 | different | cubic | none | 0.115 | very good |
| 1–18 | TiN (1.0) | TiN (1.3) | AlN (1.4) | 2.7 | 3.9 | different | cubic | none | 0.105 | very good |

TABLE 1-continued

| | | structure of coated hard layers (μm) | | | | | | | | |
|---|---|---|---|---|---|---|---|---|---|---|
| | intermediate | laminated film (1) of super thin films (a)/(b) | | | | | | | | |
| sample No | layer (3) (μm) | (a) (thicknees: nm) | (b) | cycle[1] (nm) | total[2] (μm) | crystal[3] structure | X-ray[4] pattern | surface layer (4) | flank wear (mm) | mark |
| 1–19 | TiN (3.0) | TiN (1.3) | AlN (1.4) | 2.7 | 3.8 | different | cubic | none | 0.112 | very good |
| 1–20 | TiN (5.0) | TiN (1.3) | AlN (1.4) | 2.7 | 3.7 | different | cubic | none | 0.127 | good |
| 1–21 | TiN (7.0)* | TiN (1.3) | AlN (1.4) | 2.7 | 3.8 | different | cubic | none | 0.211 | bad |
| 1–22 | none | ZrN (2.5) | AlN (1.5) | 4.0 | 3.9 | different | cubic | none | 0.135 | good |
| 1–23 | none | VN (2.5) | AlN (1.5) | 4.0 | 3.9 | different | cubic | none | 0.123 | good |
| 1–24 | none | CrN (2.5) | AlN (1.5) | 4.0 | 3.9 | different | cubic | none | 0.121 | good |
| 1–25 | none | HfN (2.5) | AlN (1.4) | 4.0 | 3.6 | different | cubic | none | 0.117 | very good |
| 1–26 | none | TiN, AlN, CrN (1.0) (1.0) (1.0) | | 3.0 | 3.2 | different | cubic | none | 0.100 | very good |
| 1–27 | none | CrN (1.7) | VN (1.7) | 3.4 | 3.7 | same* | cubic | none | 0.205 | bad |
| 1–28 | TiN (1.0) | a layer of TiCN (2.0 μm) was coated | | | | | | TiN (1.0) | 0.222 | bad |
| 1–29 | none | none | | | | | | TiN (4.0) | 0.230 | bad |
| 1–30 | TiN (2.0) | a layer of $Al_2O_3$ (1.0 μm) was coated | | | | | | TiN (0.5) | 0.200 | bad |

Note:
[a]Sample Nos 1–28 to 1–30 are comparative examples
[b]In sample Nos. 1–28 and 1–30, a layer of TiCN (2.0 μm) and $Al_2O_3$ (1.0 μm) was coated in place of the laminated film of super thin films (a)/(b)
[c]Sample No. 1–30 was prepared by CVD Table 1, star mark (*) indicates outside the present invention. For example, a laminated film in Sample No. 1-1 is outside the present invention due to a thickness of TiN=0.14 nm, of AlN=0.16 (the total thickness=3.4 μm) and of lamination cycle=0.3 nm. In a film of Sample No. 1-1, no clear layered structure was observed but a mixed layer of islands was observed by a transmission electron microscope (TEM).

Sample Nos. 1-28 to 1-30 are comparative examples and are cutting tips having the conventional coating layers. Sample No. 1-28 has a hard coat layer consisting of TiCN layer and TiN layer prepared on the same tip as Example 1 by ion-plating technique under vacuum arc discharge in usual film forming machine. Sample No. 1-29 has a hard coat layer of TiN layer prepared by the same method as Sample No. 1-28. Sample No. 1-30 has a hard coat layer consisting of TiN layer and $Al_2O_3$ layer prepared on the same tip as Example 1 by usual CVD technique.

EXAMPLE 2

Procedure of Example 1 was repeated but a film forming apparatus shown in FIG. 3A was used (totally four targets of Ti and Al were used) and a laminated film was prepared from the same material and under the same conditions as Example 1–6 (TiN layer=5.9 nm and AlN layer=3.0 nm).

Existence of the lamination modulation layers was confirmed by the observation of transmission electron microscope (TEM), energy dispersion type X-ray analyzer (EDX) and electron energy loss spectroscopy (EELS).

The flank wear of this example was 0.100 mm.

EXAMPLE 3

Procedure of Example 1 was repeated but the content (vol %) of CBN in the substrate and compositions of binder were changed to Table 2.

X-ray diffraction patterns of the resulting sintered articles revealed existence of inevitable contaminations which were thought to be $\alpha$-$Al_2O_3$, WC and Co.

The resulting CBN sintered body was shaped into a tip for cutting tool and an intermediate layer of TiN having a thickness of 2 μm was deposited on portions of the tip where cutting participate by usual PVD technique and then the laminated film consisting of super thin films of TiN and AlN was deposited alternatively to the total thickness of 4.2 μm. Each super thin film had a thickness of 2.6 nm and the lamination cycle was 5.2 nm. In operation, the film forming apparatus shown in FIG. 2A was used.

X-ray diffraction patterns revealed that of all of the resulting laminated films had a crystal structure of cubic system.

Table 2 shows time until damage (=a time duration until the tool was damaged: min) which was determined when a round steel rod of carburized hardened SCM415 was cut by the resulting tools along its periphery.

TABLE 2

| Sample No | CBN (vol %) | composition of binder | time until damage (min) |
|---|---|---|---|
| 2–1 | 35 | 80: (TiHf)C, 20: $TiB_2$, AlN, $AlB_2$ | 25 |
| 2–2 | 70 | 78: (TiW)N, 22: AlN, $AlB_2$, $TiB_2$ | 42 |
| 2–3 | 95 | 80: TiCN, 10: WC, 10 $TiB_2$, AlN | 22 |
| 2–4 | 45 | 70: TiCN, $CO_3W_3B$, 30: AlN, $AlB_2$ | |
| 2–5 | 80 | 80: CoWC, $Co_3W_3B$, 20: AlN | 39 |
| 2–6 | 98 | 100: AlN | 29 |
| 2–7 | 65 | 40: TiN, 20: VN, 20: HfC, 20: AlN, $TiB_2$ | 26 |
| 2–8 | 99 | 100: $Mg_2B_2N_4$, $Li_2B_2N_4$ | 23 |

TABLE 2-continued

| Sample No | CBN (vol %) | composition of binder | time until damage (min) |
|---|---|---|---|
| 2–9 | 60 | 100: $Al_2O_3$ | 4 |
| 2–10 | 20 | 60: TiN, 40: $AlB_2$, $TiB_2$ | 11 |

Note:
Time until damage of CBN tool (CBN = 80 vol%, binder: 80: CoWB, $Co_3W_3B$; 20: AlN) having no laminated film is 10 min.

EXAMPLE 4

A mixture of CBN power and a binder consisting of CoWB, $Co_3W_3B$, AlN and $AlB_2$ (volume ratio of 80:20) was sintered at 1,450° C. under a pressure of 50 kb for 30 minutes to obtain CBN sintered bodies.

The resulting CBN sintered body was shaped into a tip for cutting tool and the laminated film consisting of super thin films was deposited on portions of the tip where cutting participate by the same ion-plating technique with vacuum arc-discharge as Example 1. Operation was carried out in the apparatus shown in FIG. 2A.

In this case, Ti, Al, Ti-Al, C, Zr, V, Hf and Cr were used as targets. Thickness of the super thin films of TiN, AlN, TiAlN, TiC, ZrN, VN, HfN and CrN was controlled by deposition time duration.

The results are summarized in Table 3.

TABLE 3

| | | structure of coated hard layers (μm) | | | | | | | |
|---|---|---|---|---|---|---|---|---|---|
| | intermediate | laminated film (1) of super thin films (a)/(b) | | | | | | | |
| sample No | layer (3) (μm) | (a) (thicknees: nm) | (b) | cycle[1] (nm) | total[2] (μm) | crystal[3] structure | X-ray[4] pattern | surface layer (4) | flank wear (mm) | mark |
| 3–1 | none | TiN | AlN | 0.15* | 3.4 | different | cubic | none | 0.310 | bad |
| 3–2 | none | TiN | AlN | 0.6 | 3.5 | different | cubic | none | 0.141 | good |
| 3–3 | none | TiN | AlN | 2.5 | 3.8 | different | cubic | none | 0.117 | very good |
| 3–4 | none | TiN | AlN | 5 | 3.5 | different | cubic | none | 0.108 | very good |
| 3–5 | none | TiN | AlN | 18 | 3.6 | different | cubic | none | 0.131 | good |
| 3–6 | none | TiN | AlN | 30 | 3.4 | different | cubic | none | 0.107 | good |
| 3–7 | none | TiN | AlN | 40 | 3.5 | different | cubic | none | 0.124 | good |
| 3–8 | none | TiN | AlN | 80* | 3.6 | different | cubic +* hexagonal | none | 0.322 | bad |
| 3–9 | none | TiAlN | AlN | 0.15* | 3.5 | different | cubic | none | 0.288 | bad |
| 3–10 | none | TiAlN | AlN | 1 | 3.7 | different | cubic | none | 0.142 | good |
| 3–11 | none | TiAlN | AlN | 3 | 3.6 | different | cubic | none | 0.114 | very good |
| 3–12 | none | TiAlN | AlN | 8 | 3.2 | different | cubic | none | 0.097 | very good |
| 3–13 | none | TiAlN | AlN | 15 | 3.3 | different | cubic | none | 0.135 | good |
| 3–14 | none | TiAlN | AlN | 20 | 3.3 | different | cubic | none | 0.116 | very good |
| 3–15 | none | TiAlN | AlN | 35 | 3.5 | different | cubic | none | 0.140 | good |
| 3–16 | none | TiAlN | AlN | 50* | 3.0 | different | cubic* hexagonal | none | 0.299 | bad |
| 3–17 | none | TiCN | AlN | 5 | 3.4 | different | cubic | none | 0.144 | good |
| 3–18 | none | TiC | AlN | 5 | 3.8 | different | cubic | none | 0.129 | good |
| 3–19 | TiN (0.5) | TiN | AlN | 5 | 3.9 | different | cubic | none | 0.108 | very good |
| 3–20 | none | TiN | AlN | 5 | 3.2 | different | cubic | TiN (0.6) | 0.115 | very good |
| 3–21 | none | ZrN | AlN | 2 | 3.2 | different | cubic | none | 0.150 | good |
| 3–22 | none | VN | AlN | 6 | 3.5 | different | cubic | none | 0.144 | good |
| 3–23 | none | CrN | AlN | 5 | 3.5 | different | cubic | none | 0.136 | good |
| 3–24 | none | HfN | AlN | 3 | 3.4 | different | cubic | none | 0.127 | good |
| 3–25 | none | TiN/Cr/AlN [a] | | 9 | 3.2 | different | cubic | none | 0.088 | very good |
| 3–26 | none | CrN | ZrN | 9 | 3.7 | same | cubic | none | 0.232 | bad |
| 3–27 | TiN (1.0) | TiCN coated (2.0 μm)[b] | | | | | | TiN (1.0) | 0.305 | bad |
| 3–28 | none | none | | | | | | TiN (4.0) | 0.291 | bad |
| 3–29 | TiN (2.0) | $Al_2O_3$ coated layer (1.0 μm)[c] | | | | | | TiN (0.5) | 0.278 | bad |

Note:
In this Example, thickness of unit layer: (a) ≈ (b)
[1]"cycle" is the lamination cycle,
[2]"total" is a total thickness,
[3]"crystal structure" is a crystal structure of a single film under equilibrium condition at ambient temperature and pressure, and
[4]"X-ray pattern" is a X-ray pattern of the laminated film on the whole.
[a]TiN ≈ Cr ≈ AlN ≈ 3 nm
[b]Sample Nos 3–34 to 3–36 are comparative examples
[c]In sample Nos. 3–34 and 3–36, a layer of TiCN (2.0 μm) and $Al_2O_3$ (1.0 μm) was coated in place of the laminated film of super thin films (a)/b)
[c]Sample No. 3–36 was prepared by CVD Sample Nos. 3-34 to 3-36 are comparative examples and are cutting tips having the conventional coating layers prepared by the same method as the comparative example of Example 1.

Wear-resistance of the resulting tips was determined by cutting test in which a round steel rod (SKD11) having a hardness of HRC60 was cut along its periphery at a cutting speed of 220 mm/min, a depth of cut of 0.5 mm, a feed of 0.25 mm per revolution and for 15 minutes in a dry condition to measure a flank wear width (mm).

EXAMPLE 5

Procedure of Example 1 was repeated but the Al target was replaced by B target. Results are summarized in Table 4.

TABLE 4

| | | structure of coated hard layers ($\mu$m) | | | | | | | |
|---|---|---|---|---|---|---|---|---|---|
| | intermediate | laminated film (1) of super thin films (a)/(b) | | | | | | | |
| sample No | layer (3) ($\mu$m) | (a) (thicknees: nm) | (b) | cycle[1] (nm) | total[2] ($\mu$m) | crystal[3] structure | X-ray[4] pattern | surface layer (4) | flank wear (mm) | mark |
| 5–1 | TiN (1.0) | TiN (1.3) | BN (1.4) | 2.7 | 3.6 | different | cubic | TiN (1.0) | 0.110 | good |
| 5–2 | TiN (1.0) | TiN (1.3) | BN (1.0) | 2.3 | 3.7 | different | cubic | TiN (1.0) | 0.100 | very good |
| 5–3 | TiN (1.0) | TiN (1.3) | BN (1.2) | 3.8 | 3.8 | different | cubic | TiN (1.0) | 0.105 | very good |

[1]"cycle": the lamintion cycle,
[2]"total": total thickness,
[3]"crystal structure": a crystal structure of a single film under equilibrium condition at ambient temperature and pressure, and
[4]"X-ray pattern": a X-ray pattern of the laminated film on the whole.

EXAMPLE 6

Procedure of Example 1 was repeated but the contents of CBN (vol %) and composition of the binder (wt %) were changed to those shown in Table 5. Each composition was sintered under 50 kb, at 1,450° C. and for 15 minutes.

The resulting sintered article was shaped into a tip of SNGN 120408 (ISO norm) and the laminated film consisting of super thin films was deposited on portions of the tip by using CH$_4$ gas and N$_2$ gas by the same technique as Example 1. In operation, an intermediate layer of TiCN was firstly deposited at a thickness of 2 $\mu$m, then super thin film consisting of alternative TiC and AlN layers were deposited to the total thickness of 5 $\mu$m. Thickness of TiC layer was 3 nm and thickness of AlN layer was 3 nm Wear-resistance of the resulting tips was determined by cutting test in which a test material (SKD11) having a hardness of HRC60 and having four U-shaped grooves on its periphery was cut at a cutting speed of 120 mm/min, a depth of cut of 0.2 mm, a feed of 0.1 mm per revolution until 1 km to measure the damaged percentage (sample number is 5). For comparison, usual CBN sintered body having no laminated film according to the present invention was also trested.

Results are summarized in Table 5.

TABLE 5

| Sample No | CBN (vol\|%) | composition of binder | composition of binder in (wt %) | rupture strength (kgf/mm$^2$) | damage rate (%) |
|---|---|---|---|---|---|
| 5–1 | 96 | TiN Al | 80: TiN 20: AlN, AlB$_2$, TiB2 | 60 | *100 100 |
| 5–2 | 96 | Co, Al, WC, TiN | 98: CoWB, Co$_{21}$W$_2$B, AlN, AlB$_2$ 2: TiN | 75 | *100 100 |
| 5–3 | 92 | Co, Al, WC, TiN | 98: CoWB, Co$_{21}$W$_2$B, AlN, AlB$_2$ 2: TiN | 85 | *100 80 |
| 5–4 | 87 | TiN Al | 60: TiN 40: AlN, AlB$_2$, TiB$_2$ | 95 | *100 60 |
| 5–5 | 85 | TiCN Al, WC | 75: TiCN 10: WC 15: AlN, AlB$_2$, TiB$_2$ | 90 | *100 80 |
| 5–6 | 85[1] | Co, Al, WC, TiN | 98: CoWB, Co$_{21}$W$_2$B, AlN, AlB$_2$ 2: TiN | 105 | *80 0 |

TABLE 5-continued

| Sample No | CBN (vol%) | composition of binder | composition of binder in (wt %) | rupture strength (kgf/mm$^2$) | damage rate (%) |
|---|---|---|---|---|---|
| 5–7 | 96[2)] | Co, Al, WC, TiN | 98: CoWB, Co$_{21}$W$_2$B, AlN, AlB$_2$<br>2: TiN | 95 | *100<br>40 |
| 5–8 | 70 | (TiHf)N<br>Al | 70: (TiHf)N<br>30: AlN, AlB$_2$, TiB$_2$ | 105 | *80<br>40 |
| 5–9 | 70 | (TiHf)C<br>TiAl$_3$ | 70: (TiHf)C<br>30: AlN, AlB$_2$, TiB$_2$ | 105 | *80<br>20 |
| 5–10 | 65 | TiN, Al<br>VN, HfC | 65: TiN, VN, HfC<br>25: AlN, AlB$_2$, TiB$_2$ | 100 | *80<br>40 |
| 5–11 | 60 | Al$_2$O$_3$ | 100: Al$_2$O$_3$ | 70 | *100<br>100 |
| 5–12 | 55 | TiN$_{0.7}$<br>Al | 90: TiN<br>10: AlN, AlB$_2$, TiB$_2$ | 90 | *100<br>80 |
| 5–13 | 55 | TiN$_{0.7}$<br>Al | 70: TiN<br>30: AlN, AlB$_2$, TiB$_2$ | 120 | *60<br>0 |
| 5–14 | 55 | TiN$_{0.7}$<br>Al | 50: TiN<br>50: AlN, AlB$_2$, TiB$_2$ | 125 | *100<br>0 |
| 5–15 | 55 | TiN$_{0.7}$<br>Al | 40: TiN<br>60: AlN, AlB$_2$, TiB$_2$ | 80 | *100<br>100 |
| 5–16 | 55 | TiN$_{0.7}$<br>Al | 75: TiN<br>25: AlN, AlB$_2$, TiB$_2$ | 110 | *60<br>0 |
| 5–17 | 55 | TiN$_{0.9}$<br>Al | 75: TiN<br>25: AlN, AlB$_2$, TiB$_2$ | 105 | *60<br>20 |
| 5–18 | 55 | TiN<br>Al | 75: TiN<br>25: AlN, AlB$_2$, TiB$_2$ | 105 | *80<br>40 |
| 5–19 | 55 | TiC$_{0.8}$<br>TiAl$_3$ | 60: TiC<br>40: AlN, AlB$_2$, TiB$_2$ | 105 | *100<br>20 |
| 5–20 | 55 | TiC$_{0.95}$<br>TiAl$_3$ | 60: TiC<br>40: AlN, AlB$_2$, TiB$_2$ | 90 | *100<br>100 |
| 5–21 | 55 | TiC<br>TiAl$_3$ | 60: TiC<br>40: AlN, AlB$_2$, TiB$_2$ | 90 | *100<br>100 |
| 5–22 | 45 | Co, Al<br>WC, TiN | 88: CoWB, Co$_{21}$W$_2$B, AlN, AlB$_2$<br>12: TiN | 95 | *100<br>60 |
| 5–23 | 35 | Co, Al<br>WC, TiN | 88: CoWB, Co$_{21}$W$_2$B, AlN, AlB$_2$<br>12: TiN | 85 | *100<br>100 |
| 5–24 | 34 | TiN<br>Al | 60: TiN<br>40: AlN, AlB$_2$, TiB$_2$ | 90 | *100<br>80 |
| 5–25 | 20 | TiN<br>Al | 60: TiN<br>40: AlN, AlB$_2$, TiB$_2$ | 80 | *100<br>100 |

Note
1) average particle size = 2 μm
1) average particle size = 5 μm

We claim:

1. A cutting tool comprising a super hard composite material, comprising a substrate of cubic boron nitride sintered body containing more than 20% by volume of cubic boron nitride on which is laminated a film consisting of super thin films (a) and (b), each deposited alternatively on at least a portion of said substrate where cutting occurs, said super thin film (a) being made of nitride, carbide or carbonitride of at least one element selected from a group consisting of IVb group elements, Vb group elements, VIb group elements, Al and B and possessing a crystal structure of cubic system and metallic bond property, said super thin film (b) being made of at least one compound possessing a crystal structure other than cubic system and covalent bond property under equilibrium condition at ambient temperature and pressure, each unit layer of said super thin films (a) and (b) having a thickness of 0.2 nm to 20 nm, and said laminated film on the whole possessing a crystal structure of cubic system.

2. The cutting tool set forth in claim 1, wherein a composition modulated layer in which composition changes gradually and continuously is interposed between adjacent super thin films (a) and (b).

3. The cutting tool set forth in claim 1, wherein said super thin film (b) that possesses covalent bond property is a compound that contains Al or B.

4. The cutting tool set forth in claim 1, wherein said super thin film (b) that possesses metallic bond property is nitride, carbide, carbonitride, composite nitride, composite carbide or composite carbonitride that contains at least one element selected from a group consisting of Ti, Zr, Cr, V, Hf, Al and B.

5. The cutting tool set forth in claim 1, additionally comprising an intermediate layer made of at least one member selected from a group consisting of boride, nitride, carbide and oxide of IVb, Vb and VIb elements and solid solutions thereof is interposed between said substrate and said laminated film.

6. The cutting tool set forth in claim 1, additionally comprising a surface layer made of at least one member selected from a group consisting of boride, nitride, carbide and oxide of IVb, Vb and VIb elements is deposited on an outer surface of said laminated film.

7. The cutting tool set forth in claim 1, wherein said laminated film has a thickness of 0.5 nm to 10 nm.

8. The cutting tool set forth in claim 1, wherein said substrate is a cubic boron nitride sintered article containing 30 to 90% by volume of cubic boron nitride, the remainder of said cubic boron nitride sintered article being a binder consisting of at least one member selected from a group consisting of boride, nitride, carbide and oxide of IVb, Vb and VIb elements and solid solutions thereof and aluminum compound, and inevitable impurities.

9. The cutting tool set forth in claim 8, wherein said binder consists of 50 to 98% by weight of at least one member selected from a group consisting of TiC, TiN, TiCN, (TiM)C, (TiM)N and (TiM)CN in which M is a transition metal selected from IVb, Vb and VIb elements except Ti, and 2 to 50% by weight of aluminum compound.

10. The cutting tool set forth in claim 9, wherein said binder consists of 50 to 98% by weight of TiN, 2 to 50% by weight of aluminum compound, and inevitable impurities.

11. The cutting tool set forth in claim 10, wherein said substrate is cubic boron nitride sintered article obtained from cubic boron nitride powder, binder powder consisting of $TiN_z$ (in which z is $0.5 \leq z \leq 0.85$), aluminum or aluminum compound, and inevitable impurities, said binder consisting of 50 to 80% by weight of TiN and 20 to 50% by weight of compound, $TiB_2$, and inevitable impurities and possessing a transverse rupture strength determined according to JIS of higher than 110 $kgf/mm^2$.

12. The cutting tool set forth in claim 9, wherein said binder consists of 50 to 98% by weight of TiC, 2 to 50% by weight of aluminum compound, and inevitable impurities.

13. The cutting tool set forth in claim 12, wherein said substrate is cubic boron nitride sintered article obtained from cubic boron nitride powder, binder powder consisting of $TiC_z$ (in which z is $0.65 \leq z \leq 0.85$), aluminum or aluminum compound, and inevitable impurities, said binder consisting of 50 to 80% by weight of TiC and 20 to 50% by weight of compound, $TiB_2$, and inevitable impurities and possessing a transverse rupture strength determined according to JIS of higher than 105 $kgf/mm^2$.

14. The cutting tool set forth in claim 1, wherein said substrate is cubic boron nitride sintered article containing 40 to 95% by volume of cubic boron nitride, the remainder of said cubic boron nitride sintered article being a binder selected from a group consisting of TiN, boride and carbide of Co or W, aluminum nitride, aluminum boride and solid solutions thereof, and inevitable impurities.

15. The cutting tool set forth in claim 14, wherein said cubic boron nitride powder has an average particle size of less than 3 $\mu$m, and said cubic boron nitride sintered body has a transverse rupture strength determined according to JIS of higher than 105 $kgf/mm^2$.

16. The cutting tool set forth in claim 14, wherein said binder contains 1 to 50% by weight of TiN and at least one member selected from a group consisting of boride and carbide of Co or W, aluminum nitride, aluminum boride and solid solutions thereof.

17. The cutting tool set forth in claim 1, wherein said substrate is cubic boron nitride sintered article containing more than 90% by volume of cubic boron nitride, the remainder of said cubic boron nitride sintered article being a binder consisting of boronitride of Ia or IIa elements, TiN, and inevitable impurities.

18. The cutting tool set forth in claim 17, wherein said binder contains 1 to 50% by weight of TiN and boronitride of Ia or IIa elements.

19. Tools prepared from the super hard cutting tool set forth in claim 1.

* * * * *